Sept. 9, 1958   B. M. GALLAGHER   2,850,988
LOCOMOTIVE
Filed Sept. 16, 1954   4 Sheets-Sheet 1

INVENTOR
Brian M. Gallagher
BY S. C. Thorpe
ATTORNEY

Sept. 9, 1958     B. M. GALLAGHER     2,850,988
LOCOMOTIVE

Filed Sept. 16, 1954     4 Sheets-Sheet 3

INVENTOR
Brian M. Gallagher
BY S. C. Thorpe
ATTORNEY

Sept. 9, 1958 B. M. GALLAGHER 2,850,988
LOCOMOTIVE
Filed Sept. 16, 1954 4 Sheets-Sheet 4
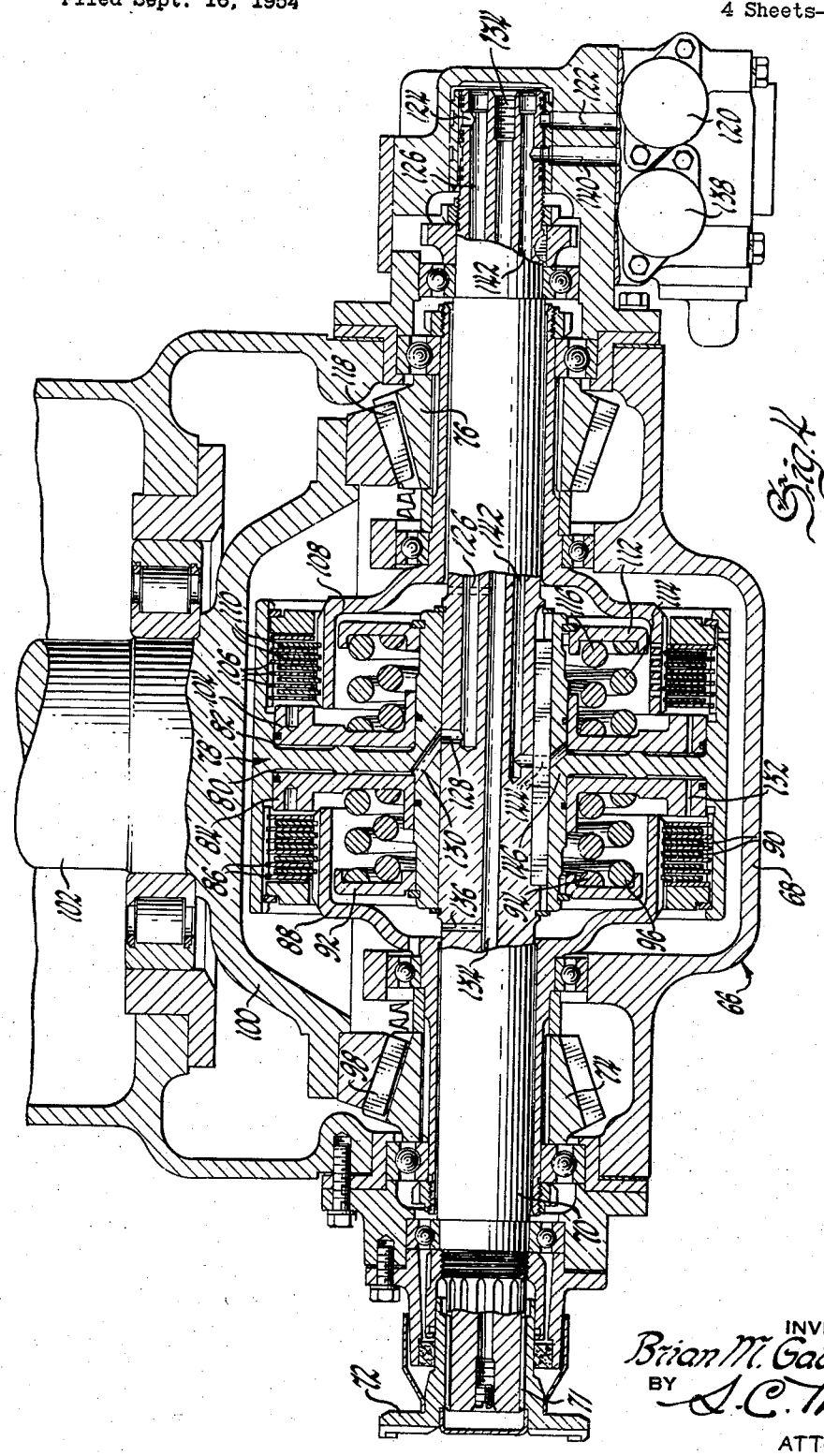
INVENTOR
Brian M. Gallagher
BY
S. C. Thorpe
ATTORNEY 
United States Patent Office 2,850,988
Patented Sept. 9, 1958

2,850,988
LOCOMOTIVE

Brian M. Gallagher, La Grange, Ill., assignor to General Motors Corporation, Detroit, Mich., a corporation of Delaware Application September 16, 1954, Serial No. 456,546

2 Claims. (Cl. 105—62)

This invention relates generally to locomotives and more particularly to switching and transfer locomotives of the diesel hydraulic type.

There has long been a need for a locomotive of simplified but rugged construction which is sufficiently flexible to achieve both locomotive transfer and locomotive switching operations.

It is therefore an object of this invention to provide a versatile but simply constructed locomotive which is capable of operating as either a switching or a transfer locomotive.

It is a further object of this invention to provide a small switching and transfer locomotive having an unusual range of power and speed for its size and function.

It is another object of this invention to provide a locomotive in which two engines are arranged at either end so that either or both of the engines may be operated and power may be transmitted through a single transmission directly to a single set of driving wheels.

It is another object of this invention to provide a unique transmission for a small switching and transfer locomotive wherein the transmission is solely supported and operably coupled for driving an axle of the locomotive, the only substantial connection between the locomotive body and the transmission being a torque reaction link to prevent turning of the transmission about the locomotive axle driven thereby.

It is a further object of this invention to provide a locomotive having a switching speed range and a transfer speed range.

For related and other objects of this invention attention is directed to the accompanying detailed description and drawings, in which:

Fig. 1a illustrates how the end wheels of the locomotive are connected to and driven by the center wheels through counterbalanced side rods.

Fig. 3 also illustrates how this unique transmission is simply and solely supported on the center axle for direct movement therewith.

Fig. 4 is a detailed illustration with parts in section and parts removed of one of the two hydraulically operated disc clutches used to connect the engines to the transmission for forward and reverse operation of the locomotive.

Figure 1:
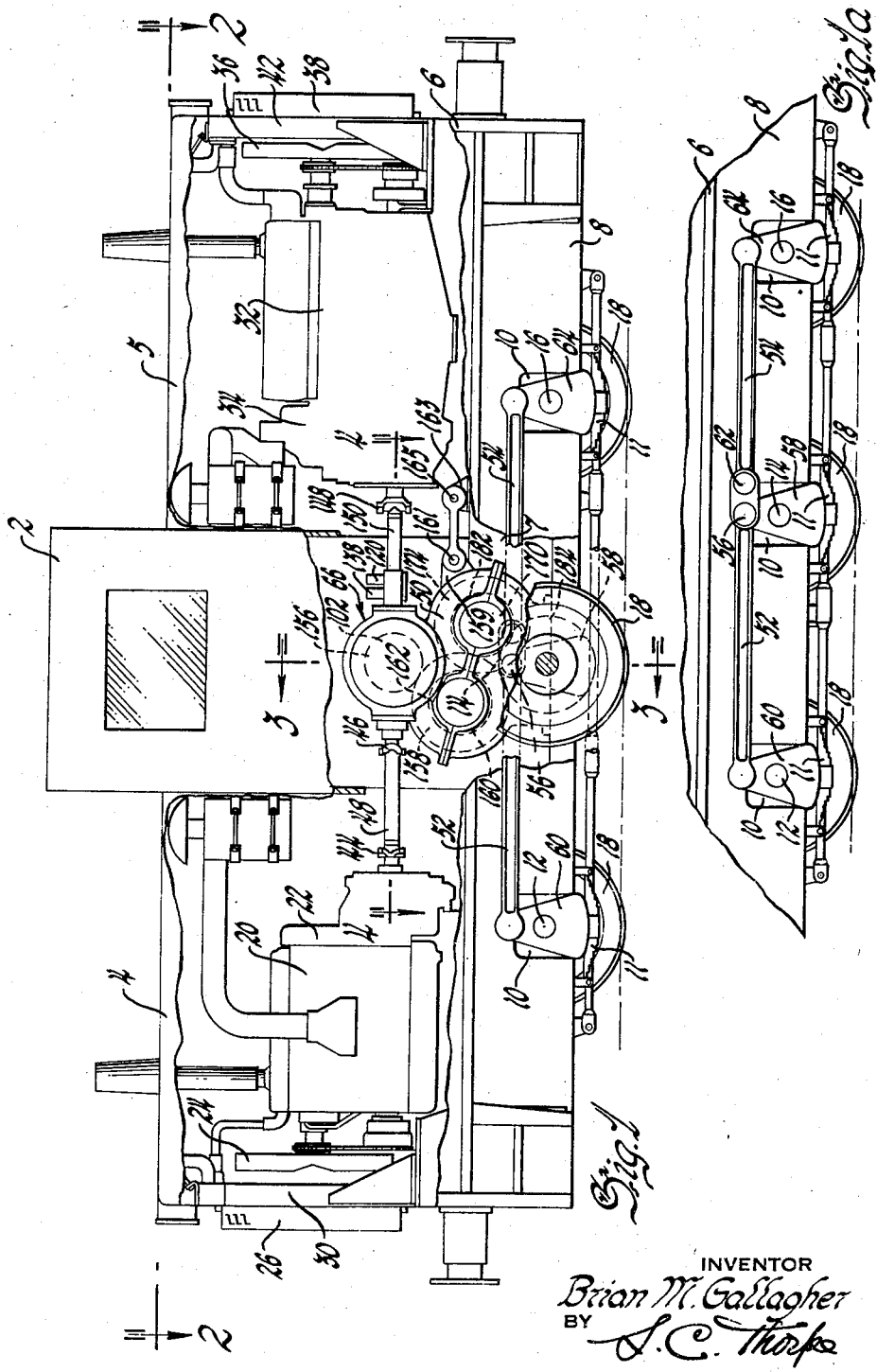
Fig. 1 is a side view in elevation of the novel locomotive with parts broken away to illustrate several of the unique features thereof.
Figure 2:
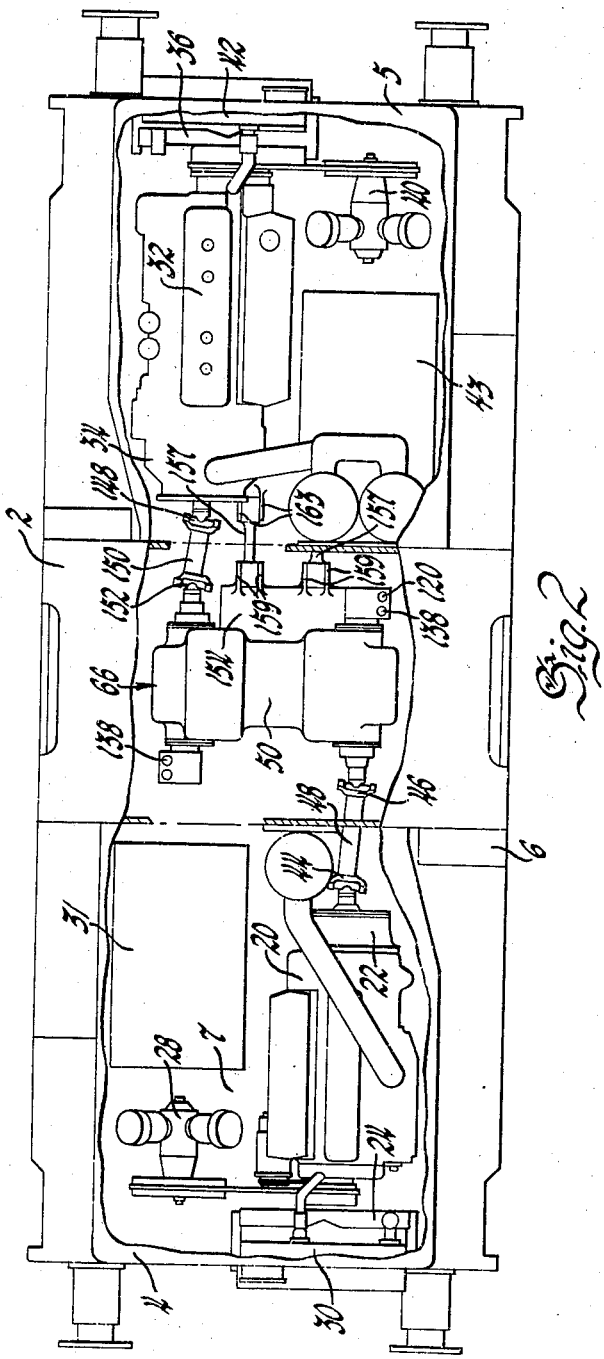
Fig. 2 is a top view with parts of the locomotive broken away to illustrate the general arrangement of the power plants of the locomotive.

Referring first to Figs. 1 and 2, the locomotive comprises a center cab 2 having arranged on either side thereof engine housings 4 and 5. Cab 2 and housings 4 and 5 are supported on a locomotive frame assembly 6 which includes a large longitudinally extending flat bed plate 7 and longitudinally extending vertically disposed side plates 8. Located in each of the side plates 8 are three pedestal openings 10 which are adapted to receive suitable journal box assemblies for journaling the ends of axles 12, 14 and 16 in the pedestal openings 10. The journal box assemblies are supported in the pedestal openings 10 by means of semi-elliptical leaf spring assemblies 11 pivotally secured to the under edges of the side plates 8. Attached to the axles 12, 14 and 16 for rotation therewith are the usual locomotive wheels 18.

Supported on suitable engine mounts resting on the bed plate 7 below the hood or engine housing 4 is a diesel engine 20 having built integral therewith a hydraulic torque converter unit 22. The diesel engine 20 is provided with the usual engine accessories including an engine-driven cooling fan 24 which draws air into one end through the manually operated shutters 26. It will be observed from Fig. 2 that the engine 20 also drives a compressor 28 which in addition to providing compressed air for operating the locomotive and train brakes also supplies pressurized air for operating various pneumatic devices in the locomotive. The engine 20 is provided with a cooling system including the aforementioned fan 24, shutters 26 and a cooling radiator 30. Since the radiator fan, compressor, torque converter and engine are of conventional design and in and of themselves do not form the subject of this invention no further description is deemed necessary with respect to them. An engine fuel tank 31 is located in line with compressor 28 and beside engine 20 to balance the weight and arrangement of housing 4.

A similar diesel engine 32 having a torque converter 34 integrally formed therewith is suitably mounted on the bed plate 7 below the hood or housing 5. The engine 32 also drives a cooling fan 36 which draws air into an end of the locomotive through the shutters 38. Engine 32 also drives a compressor 40 which is also adapted to supply pressurized air to the locomotive and train brakes as well as certain pneumatically operated devices in the locomotive. Engine 32 is also provided with a cooling system including the aforementioned fan 36, the shutters 38 and a cooling radiator 42. Since the engine 32 including its cooling arrangement and the compressor 40 or torque converter do not by themselves form the subject matter of this invention no further detailed description is deemed needed with respect to them. A second engine fuel tank 43 is located in line with compressor 40 and beside engine 32 to balance the weight and arrangement of housing 5.

It should be noted from Figs. 1 and 2 that engines 20 and 32 are different. This has been done to illustrate the fact that engines of different horsepowers may be mounted on the bed plate 7 below the hoods or housings 4 and 5. Normally, it would be desirable to use engines of the same horsepower on either side of the cab 2; that is, either two engines of the type 20 would be used or two engines of the type 32 of different horsepower than type 20 would be used in the locomotive. In certain instances, however, where it is necessary to have an extremely flexible range of horsepower, an engine 20 and an engine 32 representing different horsepowers could be used in one locomotive.

Referring again to Fig. 1 it will be observed that the engine 20 including torque converter 22 by means of universal joint connections 44 and 46 and a connecting link 48 transmits power to the two-speed transmission indicated generally by a numeral 50. The transmission 50, which is to be described with more particularity later, transmits the power to the axle 14 having wheels 18 attached thereto for rotation therewith. The power is then transmitted to the outer axles 12 and 14 including the wheels 18 attached thereto by means of side rods 52 and 54. It will be observed in Fig. 1a that the side rod 52 is pivotally attached at 56 to a member 58 counterweighted to evenly balance the moments of inertia about the axis of axle 14. The side rod 52 is pivotally connected at its other end to a member 60 similarly counterweighted to evenly balance the moments of inertia about the axis of axle 12. The side rod 54, as shown in Fig. 1a, is pivotally connected at 62 to one end of the side rod 52. The other end of side rod 54 is connected to a member 64 counterweighted to evenly balance moments of inertia about the axis of axle 16.

Referring again to Fig. 1 it should be emphasized that the transmission 50 includes for each engine a hydraulically operated clutch assembly which has been indicated generally by the numeral 66.

For a detailed description of one of these clutch assemblies reference should now be made to Fig. 4. The clutch assembly 66 includes as a part thereof a portion 68 of the housing for the transmission 50. Journaled for rotation in the portion 68 of the transmission housing is a shaft 70 which is driven through the splines 71 thereon meshing with those of one side of a coupling 72 connected to the universal joint 46. It will be observed that the coupling 72 may slide longitudinally on shaft 70 to compensate the link 48 for the different distances between universal joint 44 and the splined end of shaft 70. The shaft 70 has rotatably supported thereon pinions 74 and 76. Also connected to the shaft for rotation therewith is a disc clutch assembly 78. The disc clutch assembly 78 includes oppositely facing annular recesses 80 and 82. Secured in annular recess 80 is a piston 84 and a plurality of disc clutch plates 86 keyed for rotation with the assembly 78 and shaft 70. The pinion 74 is operatively connected to a hollow cylindrical member 88 whose open end extends into the annular recess 80. The hollow cylindrical member 88 is provided with similar disc clutch plates 90 which are keyed thereto for rotation therewith. Also located in the recess 80 inside of the cylindrical member 88 is a circular plate 92 which acts as a seat for nested springs 94, 96 compressed thereagainst by the piston 84. Meshing with the pinion 74 by means of teeth 98 is a large gear 100 attached to a shaft 102 of the locomotive transmission 50.

Located in the annular recess 82 is a piston 104 and a plurality of disc clutch plates 106 which are keyed to assembly 78 for rotation therewith. Operatively connected to the pinion 76 is a hollow cylindrical member 108 which extends into the recess 82. The hollow cylindrical member 108 is provided with friction clutch plates 110 which are keyed thereto for rotation therewith and which extend between the clutch plates 106. A circular plate 112 is attached to the assembly 78 and acts as a spring seat for nested springs 114 and 116 compressed thereagainst by piston 104. The pinion 76 also meshes with the large gear 100 by means of teeth 118.

Figure 3:
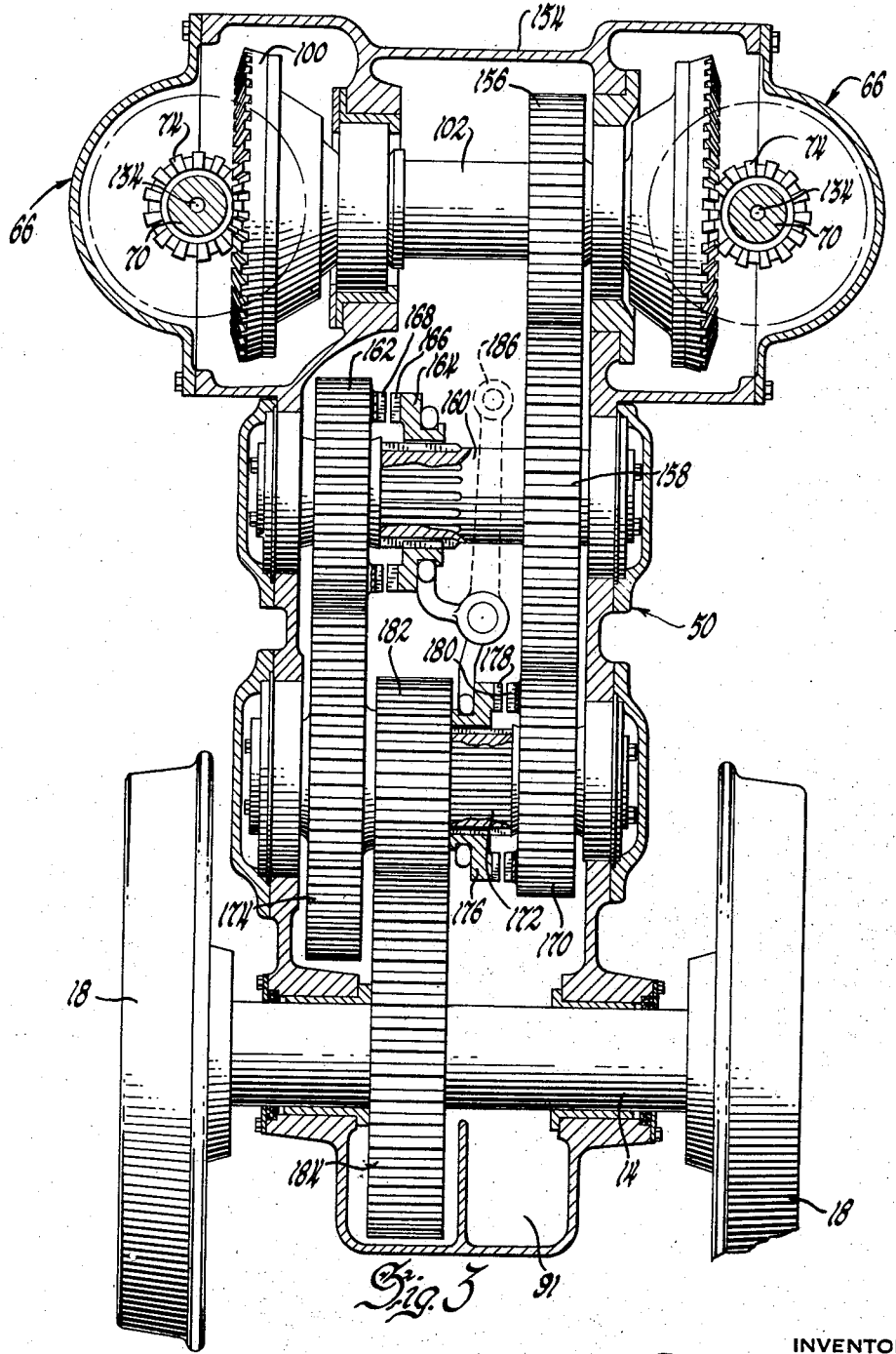
Fig. 3 is a view taken on the line 3—3 of Fig. 1 and shows the details of the unique transmission for the locomotive including the jaw clutch assemblies for selecting the transfer or switching speed ranges.

It will be observed that if shaft 70 is being turned by engine 20 and pinion 74 is clutched thereto for rotation therewith the shaft 102 will be turned in one direction by the gear 100. If, however, pinion 74 is idling on the shaft 70 and pinion 76 is clutched thereto for rotation therewith the gear 100 will turn shaft 102 in an opposite direction. Clutching so that pinion 74 rotates with shaft 70 is accomplished as follows: A pneumatically operated valve 120 may be opened to supply oil therethrough from a suitable oil souce. Upon opening of valve 120 the oil under pressure will pass therethrough and enter passage 122 and pass therethrough into an annular passage 124. Annular passage 124 communicates with a passage 126 in the shaft 70 leading to a radial passage 128. Radial passage 128 conducts the oil into inclined radial passage 130 which communicates with the recess 80 and applies the pressurized oil against the face of piston 84. The piston 84 is then moved under the pressure of the oil so that it further compresses the springs 94 and 96 causing the clutch plates 86 and 90 to frictionally engage each other so that cylindrical member 88 will turn at the same rotational speed as that of the assembly 78 and shaft 70. Upon closure of valve 120 it will be observed that declutching will be accomplished because the springs 94 will move the piston 84 away from the clutch plates 86 and 90 and the major portion of the oil acting against the face of piston 84 will return through the passages 130, 128, 126 and 122 to the housing of the transmission 50, as best seen in Fig. 3. The oil then flows downwardly lubricating the jaw clutches and the gear train and is finally collected by gravity in the sump 91 at the bottom of the housing. Oil that has become entrapped behind piston 84 will bleed off through passage 132. Passages 134 and 136 provide a lubricating and cooling oil supply line to the inner chamber formed by a member 88. The oil supplied to this chamber lubricates and cools clutch plates 86 and 90 by filtering around the end of cylindrical member 88. Clutching so that pinion 76 rotates with shaft 70 is accomplished in a similar manner by opening a hydraulically operated valve 138 to allow oil under pressure to flow through passages 140, 142, 144, 146 into recess 82 and against the face of piston 104. This oil pressure will cause the clutch plates 106 and 110 to frictionally engage each other so that pinion 76 is connected to shaft 70 for rotation therewith.

Although only one of these hydraulically operated disc clutch assemblies has been described, it should be appreciated that a similar assembly is provided on the opposite end of shaft 102 (see Fig. 2) for the engine 32 and that the hydraulically operated disc clutch associated with engine 32 is driven through torque converter 34 by means of a flexible linkage including a universal joint 148, a link 150 and a second universal joint 152.

In Fig. 3 it may be observed that shaft 102 extends between the hydraulically operated disc clutches 66. The shaft 102, as already described, is provided at each end thereof with a large gear 100 meshing with pinions 74 and 76, pinions 76 not being observable in Fig. 3. The shaft 102 is suitably supported in the housing 154 of the unique transmission 50. The housing 154 encloses and provides support for the shafts, pinions, gears and clutches of the transmission 50 as observed in Fig. 3. The entire housing including the transmission gearing and shafting is supported solely on the axle 14 as clearly illustrated in Fig. 3. In order to stabilize the support of the transmission 50 on axle 14 a pair of torque reaction links 157 have been provided. One end of each of the torque reaction links 157 is pivotally secured to transmission housing 154 by lugs 159 and pins 161. The opposite ends of links 157 are pivotally secured by lugs 163 and pins 165 to the locomotive frame assembly 6. These links 157 are pivotally attached between housing 154 and locomotive frame assembly 6 so that the transmission 50 may move up and down relative to the locomotive frame as it must necessarily do because of the presence of springs 11 for properly cushioning bumps, etc. The universal joints 44, 46, 148, 152 and links 48 and 150 are also for the purpose of enabling the transmission 50 to move up and down relative to engines 20 and 32.

In Fig. 3 it will be observed that attached intermediate the ends of shaft 102 for rotation therewith is a gear 156. Gear 156 meshes with and is adapted to drive a gear 158 keyed to a shaft 160, also rotatably supported by the housing 154. Also supported on shaft 160 is a pinion 162. The pinion 162 may either rotate independently of shaft 160 or be clutched thereto for rotation therewith by means of a jaw clutch 164 splined to shaft 160 for axial movement therewith and having teeth 166 for engaging cooperating teeth 168 on pinion 162. Gear 158 meshes with and drives a pinion 170 rotatably supported on a rotatable shaft 172 in housing 154. Also supported on shaft 172 for rotation therewith is a gear 174 which meshes with and is adapted to be driven by pinion 162. It will be observed that pinion 170 may be clutched so that it will rotate with shaft 172 by means of a jaw clutch 176 splined to shaft 172 for axial movement with respect thereto. The jaw clutch 176 is provided with teeth 178 which, when the jaw clutch 176 is moved axially, engage cooperating teeth 180 on the pinion 170. As previously mentioned, shaft 172 is supported for rotation in the transmission housing 154. A second pinion 182 is supported on shaft 172 and secured thereto for rotation therewith. Pinion 182 meshes with and drives a large gear 184 secured to and adapted to drive axle 14.

It will be observed that the jaw clutches 164 and 176 are connected by an operating rod assembly 186 so that clutches 164 and 176 move together. This assures that only one of jaw clutches 164, 176 will be operable at any one time. The clutches are shown in a neutral position in Fig. 3; however, if the rod 186 is moved to the left as viewed in the figure, clutch 164 will become operative to clutch pinion 162 for rotation with shaft 160. If rod 186 is moved to the right as viewed in Fig. 3 the clutch 164 will become inoperative and clutch 176 will connect pinion 170 to shaft 172 for rotation therewith.

Assuming the slow speed to be more desirable for switcher operations the rod 186 would be move to the left or to switcher speed range position thereby rendering clutch 176 inoperative and connecting pinion 162 to shaft 160 for rotation therewith. If either one or both of the hydraulically operated clutches 66 are actuated, shaft 102 will be turned causing gear 156 to rotate therewith. Rotation of gear 156 will, of course, rotate gear 158 and shaft 160 as well as pinion 162 which is now operatively connected for rotation with shaft 160. Rotation of pinion 162 will cause rotation of gear 174 which, being larger than pinion 162, will rotate pinion 182 and gear 184, axle 14 and the wheels 18 connected thereto at a relatively low speed. If, however, it is desirable to operate in the higher speed range as, for example, for transfer operations then the operating rod, when the locomotive is at rest, may be moved to the right as viewed in Fig. 3. This will declutch pinion 162 from shaft 160 and connect pinion 170 to shaft 172 for rotation therewith. In this case, axle 14 and wheels 18 will be driven at relatively high speeds through the gear train including gears 156, 158, pinion 170, pinion 182 and gear 184.

It may now be appreciated that with this unique driving assembly a single engine may be utilized to power the locomotive and that extreme flexibility is provided in driving the locomotive by means of a torque converter built into the engine and the two speed ranges provided by the transmission of the locomotive. If additional power is desired, both engines may be coupled to the transmission as herein described and both of these engines may operate through the torque converters within the two speed ranges.

It will be observed that the entire transmission is uniquely and simply supported on the center axle and that the outer wheels are driven through the center axle by means of side rods so that the same driving adhesion is provided for the locomotive regardless of whether one or two engines are being utilized. The locomotive is provided with several horsepower ranges and several speed ranges and is adapted to be operated in either direction with equally good visibility.

I claim:

1. A locomotive comprising a plurality of longitudinally spaced wheel and axle sets, a locomotive frame resiliently supported by said wheel and axle sets, a pair of longitudinally spaced engines of different rated horsepowers supported on said frame one at either end thereof, a transmission intermediate said engines directly and solely supported on one of said wheel and axle sets and connected in driving relation therewith, a link pivotally connected to said transmission and frame to stabilize the support of said transmission on the one of said wheel and axle sets, means including flexible couplings to alternately connect said transmission to said engines to be driven thereby, side rods drivingly connecting the other of said wheel and axle sets to the one of said wheel and axle sets, hoods on said frame over each of said engines, and cooling radiators one for each of said engines disposed at opposite ends of said locomotive.

2. A locomotive comprising a plurality of longitudinally spaced wheel and axle sets, a locomotive frame resiliently supported by said wheel and axle sets, a pair of longitudinally spaced engines of different rated horsepowers supported on said frame one at either end thereof, torque converters one for each of said engines operatively connected thereto and supported on said frame, a transmission intermediate said engines directly supported on one of said wheel and axle sets and connected in driving relation therewith, a link pivotally connected to said transmission and frame to stabilize the support of said transmission on the one of said wheel and axle sets, flexible couplings having one side connected to said transmission and clutching means connected to said torque converters and the opposite sides of said couplings to alternately connect said transmission to said torque converters to be driven thereby, and side rods drivingly connecting the other of said wheel and axle sets to the one of said wheel and axle sets.

References Cited in the file of this patent

UNITED STATES PATENTS

| | | |
|---|---|---|
| 1,447,488 | Schneider | Mar. 6, 1923 |
| 2,210,798 | Dean | Aug. 6, 1940 |
| 2,225,713 | Rodler | Dec. 24, 1940 |
| 2,637,169 | Fell | May 5, 1953 |
| 2,667,843 | Dean | Feb. 2, 1954 |

FOREIGN PATENTS

| | | |
|---|---|---|
| 116,722 | Austria | Nov. 15, 1927 |
| 535,749 | France | Apr. 20, 1922 |
| 232,944 | Great Britain | Dec. 3, 1925 |